United States Patent
Johnson

[11] 3,874,617
[45] Apr. 1, 1975

[54] STOL FLAPS

[75] Inventor: Robert E. Johnson, Alamitos, Calif.

[73] Assignee: McDonnell Douglas Corporation, Santa Monica, Calif.

[22] Filed: July 17, 1974

[21] Appl. No.: 489,394

[52] U.S. Cl.............................................. 244/42 DA
[51] Int. Cl................................................. B64c 3/50
[58] Field of Search............ 244/42 R, 43, 44, 42 D, 244/42 DA, 42 DB, 42 DC, 42 CB; 74/469, 471 R

[56] References Cited
UNITED STATES PATENTS

| | | | |
|---|---|---|---|
| 2,404,956 | 7/1946 | Gouge | 244/42 DB |
| 2,583,405 | 1/1952 | Youngman | 244/42 DB |
| 2,635,837 | 4/1953 | Grant | 244/42 D |
| 3,013,748 | 12/1961 | Westburg | 244/42 DB |
| 3,767,140 | 10/1973 | Johnson | 244/42 DA |

FOREIGN PATENTS OR APPLICATIONS

| | | | |
|---|---|---|---|
| 995,545 | 12/1951 | France | 244/42 DB |
| 1,506,615 | 8/1969 | Germany | 244/42 DA |

Primary Examiner—Trygve M. Blix
Assistant Examiner—Galen L. Barefoot
Attorney, Agent, or Firm—Robert O. Richardson; Walter J. Jason; Donald L. Royer

[57] ABSTRACT

A double four-bar linkage for flap actuation on a STOL (Short Take Off and Landing) aircraft with interconnecting linkage to proportionally deflect the spoiler as the flaps are extended.

6 Claims, 8 Drawing Figures

TAKE OFF

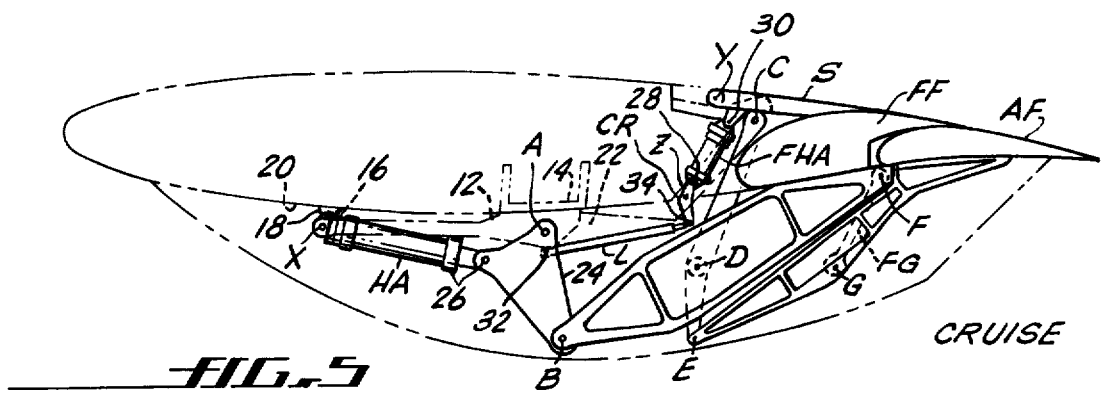
FIG. 5  CRUISE
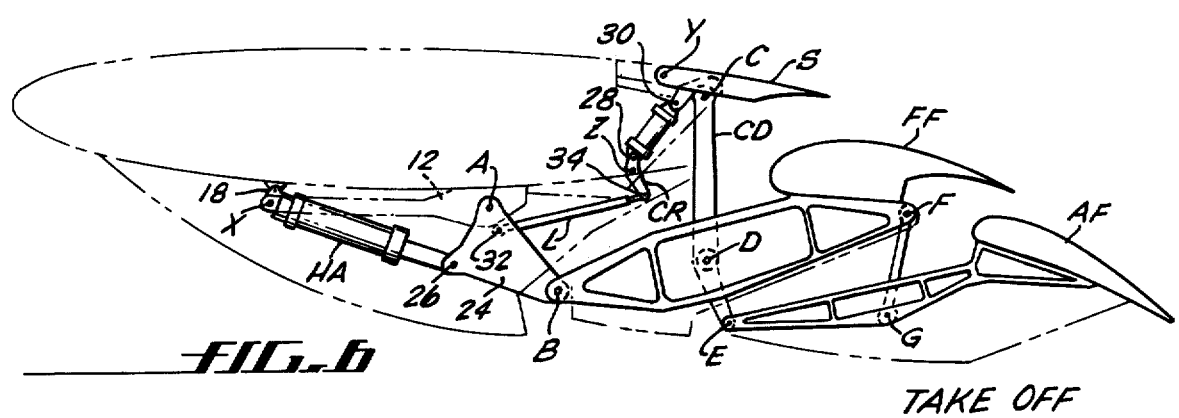
FIG. 6  TAKE OFF
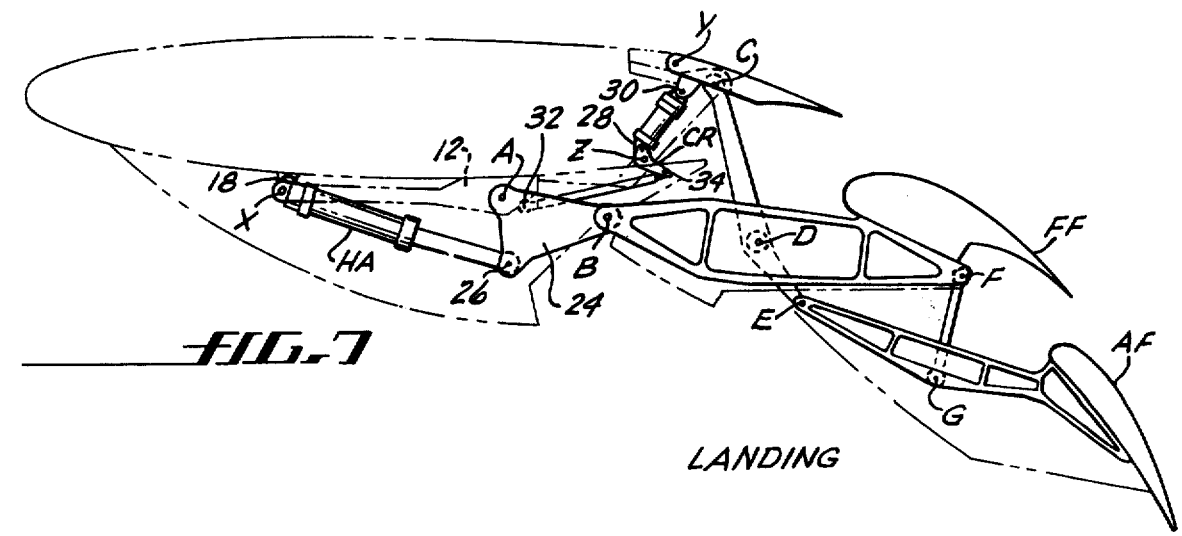
FIG. 7  LANDING

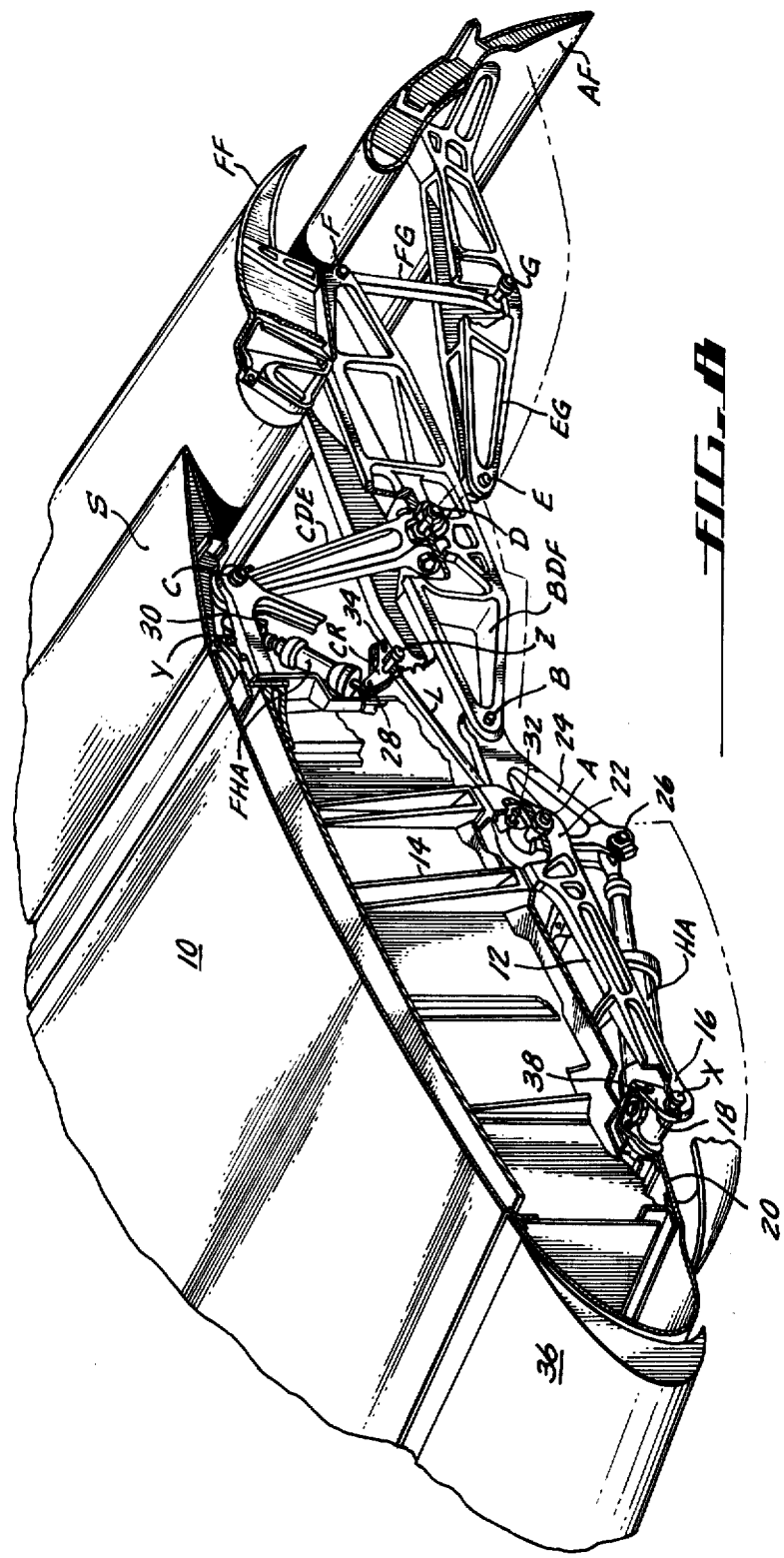

3,874,617

STOL FLAPS

BACKGROUND OF THE INVENTION

Since the airplane was first flown there have been continuing efforts to provide wing structure including flaps that would provide lift for the airplane to become airborne at the lowest possible takeoff speed and runway distance. Many kinds of linkages and actuating devices were developed to raise and lower the flaps on the trailing edge of the wing. One such structure is a six-bar linkage in my prior U.S. Pat. No. 3,767,140 for Airplane Flaps issuing Oct. 23, 1973 which is especially adapted for swept tapered wings. It coordinated actuation of the spoiler with the forward flap whereas the rear flap was independently actuated.

SUMMARY OF THE PRESENT INVENTION

The flaps and their actuating linkage, comprising the present invention, includes a double four-bar linkage for extending the fore and aft flaps. A hydraulic actuator is used to control the movement of the links and hence the flaps. Connected to and actuated by the forward flap actuating linkage is an interconnecting link for actuating the spoiler. The spoiler is pivotally mounted to the rear edge of the wing and forward of the forward flap. The spoiler thus serves as a third flap in lifting, with its downward deflection proportional to the flap extension in takeoff and in landing. The spoiler may also be hydraulically actuated in its spoiler function independently of its assistance as a lifting device. A novel connection of the actuator to the wing avoids the need for additional wing structure to carry large loads from the actuator.

BRIEF DESCRIPTION OF THE DRAWINGS

FIG. 5 is a sectional view of the wing with flaps and linkage in cruise position;

FIG. 6 is a sectional view of the wing with flaps and linkage in takeoff position;

FIG. 7 is a sectional view of the wing with flaps and linkage in landing position; and FIG. 8 is a perspective view partly in section of the structure of one embodiment utilizing the present invention.

DETAILED DESCRIPTION OF ILLUSTRATIVE EMBODIMENT

Figure 1:
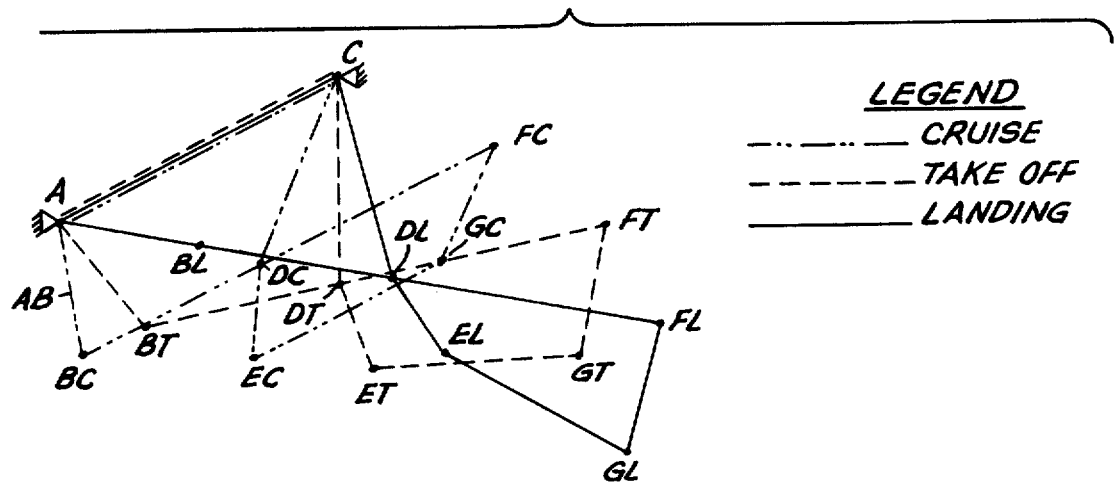
FIG. 1 is a graphic illustration of the double four-bar linkage used in extending and retracting the fore and aft flaps.

Referring now to FIG. 1 there is shown a double four-bar linkage movable between three positions, cruise, takeoff, and landing. Means for moving the linkage is not shown nor is the flap structure to be attached thereto. These will be added and discussed when reference is had to other views.

The linkage in cruise position is shown in dot and dash lines. The link between points A and C is fixed relative to the aircraft wing and does not move. Points A and C are fixed. The first four-bar linkage is between points A, BC, DC, and C. The second four-bar linkage is between DC, EC, GC, and FC. By maintaining the link between points BC, DC of the first linkage integral or rigid with the link between points DC, FC of the second linkage, any actuation or movement of the first linkage will cause the second linkage to move also.

When the linkage is moved to the aircraft takeoff position it is shown in dashed lines. Thus in takeoff the first four-bar linkage is between points A, BT, DT, and C. The second linkage is between points DT, ET, GT, and FT.

The aircraft landing position of the double four-bar linkage is shown in solid lines. The first four-bar linkage is between points A, BL, DL, and C. The second four-bar linkage is between DL, EL, GL, and FL.

It should be apparent from the foregoing that when link AB is moved from A-BC to A-BT to A-BL, the rest of the linkages also are moved from their C to T to L positions.

Figure 2:
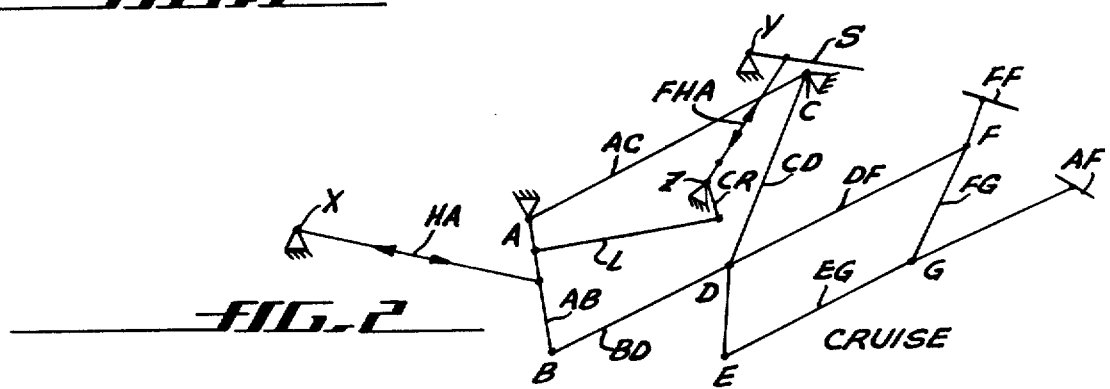
FIG. 2 is a graphic illustration of the linkage, its actuating means, and the flaps and spoiler in cruise position.
Figure 3:
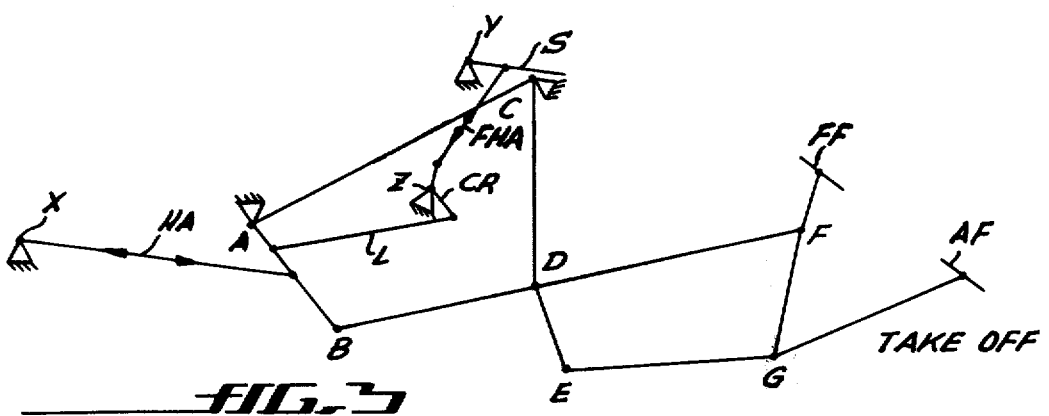
FIG. 3 is a graphic illustration of the linkage, its actuating means, and the flaps and spoiler in takeoff position.
Figure 4:
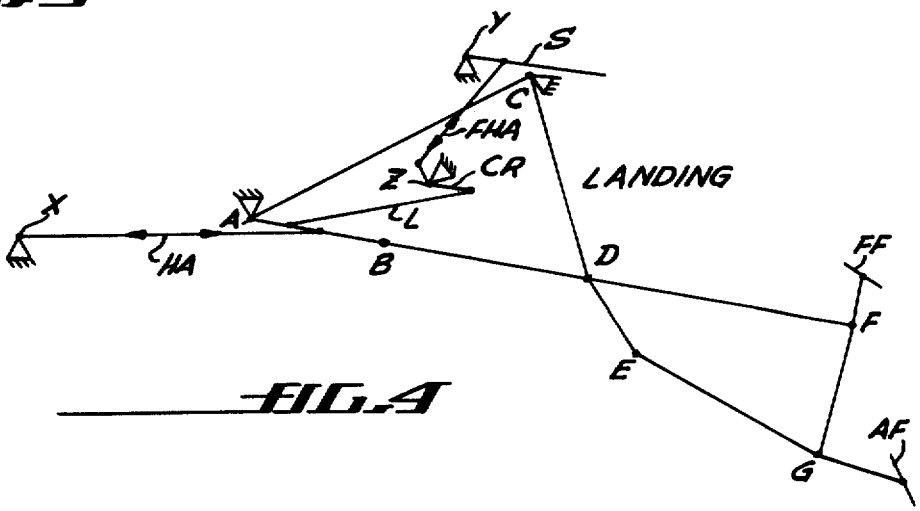
FIG. 4 is a graphic illustration of the linkage, its actuating means, and the flaps and spoiler in landing position.

Having described how a double four-bar linkage works, reference is now had to FIGS. 2, 3 and 4 to show the attachment of the fore and aft flaps, spoiler and actuator and their positions in the aircraft cruise, takeoff and landing positions.

In FIG. 2 there is shown the linkage, flaps and spoiler in cruise position. Link AC actually may be part of the wing between fixed points A and C. Fore flap FF is affixed to and moves with the link DF. Aft flap AF is affixed to an extension of link EG and moves with it. Hydraulic actuator HA is mounted at a fixed point X on the aircraft and is connected to link AB. The extension and contraction of actuator HA moves the linkage and flaps between the cruise, takeoff, and landing positions shown in FIGS. 2, 3 and 4.

Spoiler S is pivotally mounted at point Y on the trailing edge of the wing and just forwardly of fore flap FF when it is in the cruise position. The spoiler S is connected with and is operated by link AB. This is done through a fixed hydraulic actuator FHA connected to the spoiler, a crank CR pivotally mounted on the wing at point Z, and link L pivotally connected to link AB. It should be noted that when link AB rotates counterclockwise about point A, as shown in FIGS. 3 and 4, crank CR also rotates counterclockwise and moves spoiler S downwardly. This movement of spoiler S is proportional to the movement of link AB and hence flaps FF and AF. However, fixed hydraulic actuator FHA, which normally is not extended or retracted in this operation, may be separately operable to adjust the spoiler position if desired. It also may be used independently to rotate the spoiler upwardly to perform its original function as a spoiler.

FIGS. 5, 6 and 7 are sectional views of an illustrative embodiment of a wing with the double four-bar linkage for actuating the fore and aft flaps with additional linkage to actuate the spoiler. FIG. 5 shows the cruise position, FIG. 6 the takeoff position, and FIG. 7 the landing position. Here there is shown a wing 10 having a spoiler S pivotally attached to the trailing edge of the wing. Fore flap FF and aft flap AF complete the trailing edge in the cruise position in FIG. 5 and form independent aerodynamic lift surfaces as shown in the takeoff position in FIG. 6 and in the landing position in FIG. 7. With the spoiler S pivoting downwardly, instead of upwardly to interrupt air flow, it assists the lifting characteristics of the flaps FF, AF. The takeoff position in FIG. 6 of the flaps is less severe in their pivotal movement for optimum lift whereas in their more severe extension in FIG. 7 there is more drag for landing purposes. In these views the same letter indicia is used as in the earlier schematic illustrations in order that the operation of the double four-bar linkage may be clearly understood.

A support member 12 attaches to a main wing bulkhead 14 and extends forwardly and terminates at 16 in a pivotal connection X with hydraulic actuator HA. This member 12 transmits the major portion of the reaction of the hydraulic cylinder to the bulkhead 14. A pair of links 18 connect the forward end 16 of support member 12 to the undersurface 20 of wing 10 and carries the relatively small reaction load normal to the support member 12. This arrangement avoids adding a large load into that part of the wing that otherwise would have to be reinforced structurally to receive this load. Pivotally connected at point A at the aft end 22 of support member 12 is a main flap drive crank 24 which is also pivotally connected at 26 to the hydraulic actuator HA. The pivotal movement of drive crank 24 upon extension of the hydraulic actuator may be seen in FIGS. 6 and 7.

Fore flap FF is mounted on fore link BDF which is pivotally mounted at its forward end to drive crank 24 at point B. Swinging link CDE is pivotally mounted to the aft edge of wing 10 at point C, and is pivotally connected to the fore link BDF at point D. Point D is intermediate the ends of both links.

Aft flap AF is mounted on aft link EG which extends rearwardly beyond pivot G. Aft swinging link FG extends from its pivotal connection F at the rear end of fore link BDF to pivot point G on the aft link. It thus can be seen that as fore link BDF moves rearwardly with fore flap FF, both swinging links CDE and FG rotate counterclockwise to further extend aft link EG and aft flap AF. This rearward extension also results in a downward extension as can be seen in FIGS. 6 and 7.

The counterclockwise (as shown in FIGS. 5, 6 and 7) movement of main flap drive crank 24 also causes clockwise movement of spoiler S. This is done through link L, crank CR and fixed hydraulic actuator FHA. Crank CR is pivotally mounted at Z to a rear portion of wing 10. Fixed hydraulic actuator FHA connects with crank CR at pivot point 28 and to spoiler S at point 30 which is rearwardly of spoiler connection Y to wing 10. Link L connects with drive crank AB at pivot point 32 and at its other end to crank CR at pivot point 34. Although fixed hydraulic actuator FHA is "fixed" and does not extend in this operation where it merely serves as a connecting link of fixed length, it is to be understood that by separate operation it may be extended so that the spoiler may disrupt air flow in its spoiler function.

FIG. 8 shows in perspective, partly in section, wing structure with flaps and spoiler for a STOL aircraft which imposes a 167,000 pound load on each of the hydraulic actuators HA. The wing 10 has a metal skin riveted to underlying stringers, ribs and other reinforcing members in a conventional manner. Access holes for ducting for fuel, hydraulic and electrical lines appear throughout as needed. The wing has slats 36 along its leading edge, spoiler S pivotally mounted at point Y on its trailing edge, and fore and aft flaps FF and AF adapted to extend rearwardly and downwardly in takeoff and landing position. These flaps form part of the aerodynamic surfaces of the wing in cruise position.

Reinforcement structure 14, located about midway between the fore and aft edges of wing 10, is sufficiently strong to receive the load from support member 12. Pivot point X between end 16 of support member 12 and links 18 uses a universal joint to permit lateral as well as vertical pivotal movement of the hydraulic actuator. Links 18 are pivotally mounted as S to mounting brackets 38 on wing undersurface 20. Spherical type bearings at point 26 connect the actuator HA to the triangular-shaped main flap drive crank 24. The bearing at A, between crank 24 and end 22 of support member 12, is a journal type bearing whereas the pivot B has a spherical bearing. Pivot points C, E, F, G, K, 34, 28, 30 and Y are also spherical bearings. Pivot Z is a journal type bearing which is on an eccentric to provide for rigging adjustment of the spoiler S to the faired configuration. Swinging link CDE has a gimble at pivot point D which incorporates spherical roller bearings on each side of the BDF base fitting. Spoiler S, because actuator FHA is also independently extendible under a separately commanded signal, may be used for lateral control, for speed brakes, or may be used in the direct lift control mode.

Since the various strucural parts of the flaps, their linkages and actuators in FIG. 8 have like identifying numerals and their connections and modes of operation are discussed with reference to previous drawings, further description and discussion is not deemed necessary. While this invention, just described, provides advantages on a highly tapered wing with little or no sweep, it also may be used with a swept wing as well. In such case the axes at point A are canted at different angles to accommodate sweep and taper whereas only taper was considered in the axial alignment in the nonswept wing.

While certain exemplary embodiments of this invention have been described above and shown in the accompanying drawings, it is to be understood that such embodiments are merely illustrative of, and not restrictive on, the broad invention. By way of example, the hydraulic actuators to drive the main flap crank and the spoiler may be replaced with rotatable screw type actuators, if desired. Thus, this invention should not be limited to the specific constructions or arrangements shown and described since various other obvious modifications may occur to persons having ordinary skill in the art.

What is claimed is:

1. A flap system for an aircraft wing comprising:
   an aircraft wing having a trailing edge,
   a spoiler pivotally hinged near said trailing edge,
   a main flap drive crank pivotally mounted under said wing and movable by an actuator connected thereto,
   means interconnecting said spoiler with said crank for actuation thereby,
   a first swinging link pivotally suspended from said wing,
   a fore flap mounted on a fore link, said fore link being pivotally connected to said crank,
   said swinging link and said fore link being pivotally connected whereby said fore flap may be moved by said actuator in a downwardly and rearwardly direction,
   an aft flap mounted on an aft link, an aft swinging link pivotally connected between said fore link and said aft link, said first swinging link extending beyond its pivotal connection with said fore link and being pivotally connected to said aft link whereby said aft flap may be moved by said first swinging link in a downwardly and rearwardly direction.

2. A flap system as set forth in claim 1 wherein a support member with a forward end and an aft end is mounted under said wing and extends forwardly from its attachment thereo, said actuator being attached to said forward end, said crank being pivotally attached to said support member at its aft end.

3. A flap system as set forth in claim 2 wherein links pivotally connect the forward end of said support member to said aircraft wing.

4. A flap system as set forth in claim 1 wherein said main flap drive crank is of triangular configuration with its pivotal connections with said actuator and said fore link being at the corners thereof and said means interconnecting said spoiler to said crank being connected thereto spaced from said corners.

5. A flap system as set forth in claim 1 wherein said means interconnecting said spoiler includes a pivotally mounted crank affixed to said wing, a link interconnecting said pivotally mounted crank with said main flap drive crank, and an extendible actuator interconnecting said pivotally mounted crank with said spoiler.

6. A flap system as set forth in claim 1 wherein said links comprise a double four-bar linkage system wherein the first four-bar linkage actuates the fore flap and the second four-bar linkage to which the aft flap is affixed.

* * * * *